(12) United States Patent
Moitier (10) Patent No.: US 9,693,547 B1
(45) Date of Patent: Jul. 4, 2017

(54) UAV-ENFORCED INSECT NO-FLY ZONE

(71) Applicant: Jean François Moitier, Brussels (BE)

(72) Inventor: Jean François Moitier, Brussels (BE)

(*) Notice: Subject to any disclaimer, the term of this patent is extended or adjusted under 35 U.S.C. 154(b) by 150 days.

(21) Appl. No.: 14/518,014

(22) Filed: Oct. 20, 2014

(51) Int. Cl.
| | |
|---|---|
| *A01M 1/00* | (2006.01) |
| *A01M 5/02* | (2006.01) |
| *B64C 39/02* | (2006.01) |
| *B64C 27/00* | (2006.01) |
| *B64C 27/08* | (2006.01) |
| *B64C 33/00* | (2006.01) |
| *B64D 47/02* | (2006.01) |
| *B64D 47/08* | (2006.01) |

(52) U.S. Cl.
CPC .............. *A01M 5/02* (2013.01); *B64C 27/00* (2013.01); *B64C 27/08* (2013.01); *B64C 33/00* (2013.01); *B64C 39/024* (2013.01); *B64D 47/02* (2013.01); *B64D 47/08* (2013.01); *B64C 2201/024* (2013.01); *B64C 2201/12* (2013.01)

(58) Field of Classification Search
CPC ............ B64C 39/024; B64C 2201/146; B64C 2201/128; B64C 2201/145; A01M 1/026; A01M 1/226; A01M 2200/012; A01M 31/002
USPC ........................................................ 43/132.1
See application file for complete search history.

(56) References Cited

U.S. PATENT DOCUMENTS

| | | | | |
|---|---|---|---|---|
| 1,462,416 A | * | 7/1923 | McDermott | A01M 3/002 43/134 |
| 3,894,351 A | * | 7/1975 | Iannini | A01M 1/04 43/112 |
| 4,867,731 A | * | 9/1989 | Willard | A01K 51/00 43/114 |
| 6,653,971 B1 | * | 11/2003 | Guice | A01M 1/026 342/22 |
| 6,853,328 B1 | | 2/2005 | Guice | |
| 7,057,516 B2 | * | 6/2006 | Donskoy | A01M 1/026 324/637 |
| 7,501,979 B1 | * | 3/2009 | Guice | A01M 1/026 235/400 |
| 8,400,348 B1 | * | 3/2013 | Guice | A01M 1/026 235/400 |
| 8,705,017 B2 | * | 4/2014 | Hyde | A01M 1/026 356/28 |
| 8,909,391 B1 | * | 12/2014 | Peeters | G05D 1/0027 701/2 |
| 8,973,299 B2 | * | 3/2015 | Durand | A01M 1/023 43/132.1 |
| 9,102,406 B2 | * | 8/2015 | Stark | |
| 2006/0150470 A1 | * | 7/2006 | Ronnau | A01M 1/026 43/58 |
| 2007/0169401 A1 | * | 7/2007 | Chyun | A01M 1/145 43/113 |
| 2010/0186284 A1 | * | 7/2010 | Hyde | A01M 1/226 43/132.1 |
| 2014/0226860 A1 | * | 8/2014 | Hyde | G06K 9/00362 382/103 |

(Continued)

FOREIGN PATENT DOCUMENTS

| | | |
|---|---|---|
| CN | 102897323 A | 1/2013 |
| CN | 102910292 A | 2/2013 |

*Primary Examiner* — Shin Kim (57) ABSTRACT

A system for tracking and counteracting flying insects includes an imager, a unmanned aerial vehicle with an embedded counteracting device and a processor.

13 Claims, 4 Drawing Sheets

(56) References Cited

U.S. PATENT DOCUMENTS

2015/0335004 A1\* 11/2015 Gale ................ A01M 7/0003
43/132.1

\* cited by examiner

UAV-ENFORCED INSECT NO-FLY ZONE

BACKGROUND

Prior Art

The following is a tabulation of some prior art that presently appears relevant.

U.S. Patents

| Pat. No. | Kind code | Issue date | Patentee |
|---|---|---|---|
| 6,653,971 | B1 | 2003 Nov. 25 | Guice et al. |
| 6,853,328 | B1 | 2003 Nov. 25 | Guice et al. |
| 7,501,979 | B1 | 2009 Mar. 10 | Guice et al. |
| 8,400,348 | B1 | 2013 Mar. 19 | Guice et al. |
| 8,705,017 | B2 | 2014 Apr. 22 | Hyde et al. |

Foreign patents documents

| Foreign Doc. Num. | Ctry code | Kind code | Pub. date |
|---|---|---|---|
| 102897323 | CN | A | 2013 Jan. 30 |
| 102910292 | CN | A | 2013 Feb. 6 |

Mosquitos are the vector of several human diseases including dengue, chikungunya and malaria.

Malaria alone kills more than half a million people each year around the world.

Preventing mosquito bites is therefore a major public health issue.

There are currently many mosquito control techniques available but most of them are of limited efficiency.

Mosquito nets are of great help to repel mosquitoes. However, they have to be perfectly adjusted and are not convenient to use in many daily life circumstances.

Traps and repelling devices of various kinds are widely sold and used, but while they can catch and/or repel many insects, many other usually manage to escape.

Biocontrol methods, relying for example on mosquito predators or mosquito bacteria or fungi, may be effective to a certain extent, but can only lower the number of insects without eradicating them.

Chemical mosquito control methods are widely used. However, important downsides limit their use and efficiency. Insects tend to develop a resistance towards them. The public is more and more reluctant to accept the heavy use of chemicals because they may present unwanted side-effects. They may eventually prove harmful for humans, animals and plants.

Laser based mosquito killing methods and devices could prove quite effective, because they target each mosquito individually. Therefore, they have the potential to kill each and every mosquito within their range.

However these devices require relatively powerful laser beams that are dangerous for the human eye. As a consequence they can only be operated in restricted environments free of people and animals. To this day, they appear to have only been used as fences set up around human activities, very much like mosquito nets.

Drones or unmanned aerial vehicles have been tweaked and adapted for the purpose of insect control.

However, most of such flying devices rely on a chemical action to kill the targeted insects, thus featuring all the downsides of the chemical methods.

By contrast, the present embodiments allows for the individual killing of all flying mosquitoes—or other kinds of harmful flying insects—within an area or zone, while presenting no danger for people and other animals.

SUMMARY

1. In one aspect, a system for counteracting flying insects, e.g. mosquitoes, includes an unmanned aerial vehicle (UAV), an imager, e.g. camera or scanner, an embedded counteracting device and a processor.

The processor is configured to perform different tasks related to UAV flight control and related to insect tracking and counteracting.

For identifying purposes of an insect in the field of view of the imager, the processor is configured to analyze one or more images captured by the imager, using shape, size, airspeed, trajectory, wingbeat frequency or other insect properties.

The imager may operate in the visible spectrum or within other regions of the electromagnetic spectrum, e.g. infrared. The system may further include an illumination source arranged to illuminate the field of view of the imager, e.g. LEDs. The system may include additional imagers. For example, it may include two side-by-side cameras for stereo imaging.

The system may also include other devices to identify an insect, such as a photodiode capturing the insect wingbeat frequency.

The processor is configured to track the identified insect, i.e. to compute the position of the identified insect or to compute a direction toward the identified insect.

The counteracting device is designed to kill the tracked insect, to repel it or to impair one or more of its biological functions. The counteracting device may operate by means of physical actions, e.g. pushing back, hitting, capturing, electrocuting, emitting an audio signal, a laser beam. The counteracting device may also operate by means of chemical actions, e.g. releasing an insecticide.

The system may further include sensors to avoid collisions in flight and optimize flight trajectories, e.g. sonars or infrared distance sensors. For the purpose of avoiding collisions in flight and optimizing flight trajectories, the system may also rely on the processing of images captured by the imager. The system may be further configured to achieve a mapping of the surrounding environment.

The system may include only one processor or may include one or more additional processors.

The entire system may be completely embedded in the UAV or may include one or more non-airborne components. For example, the system may feature a ground station that includes a processor and/or an imager.

The system may include more than one UAV that may collaborate.

2. In another aspect, a method for counteracting flying insects includes acquiring images from an imager.

The method determines from an image or sets of images whether or not it includes a flying insect. The method determines from an image or sets of images whether or not the insect belongs to the targeted species or subspecies, e.g. mosquito, *aedes albopictus* etc. The method may further determinate, from the image or set of images, insect position data and insect movement data such as speed and direction. The method may further determinate from the image or set of images specific biological properties, e.g. insect gender. The images or sets of images used by the method to perform the above-mentioned tasks may be the same or may be different in size, resolution or other characteristics and features. They may be taken simultaneously or in sequence. They may be taken by the same imager or by different ones.

The method includes performing counteracting actions or operating a counteracting device.

The method includes flying an UAV. The method may include flying the UAV to a position enabling the processor to identify an insect. The method may include flying the UAV to a position enabling the counteracting device to be operated. The method may include avoiding obstacles in flight. The method may include moving the UAV to perform a search for insects within a specific volume or zone. The method may include protecting a volume or zone against airborne insects. The method may include mapping the protected volume or zone.

The method may extend to a set of collaborating UAVs.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

First Embodiment

Description

In the following description, reference is made to the accompanying drawing (FIG. 1), which form a part hereof.

Figure 1:
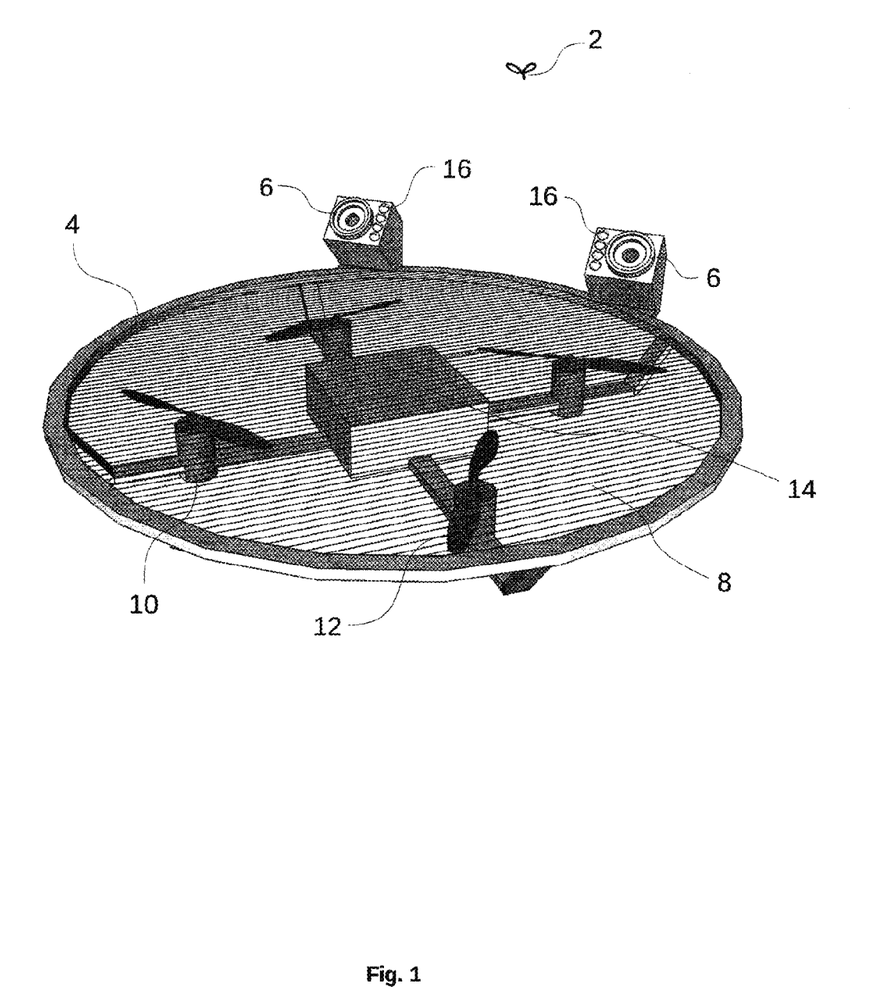
FIG. 1 illustrates the first embodiment of a tracking and counteracting system.

As shown in FIG. 1, a system for identifying, tracking and electrocuting female mosquitoes 2 includes in a particular embodiment a UAV 4, two infrared CMOS cameras 6, an electrified grid 8 and two processors.

This particular embodiment is designed to counteract female mosquitoes, however other embodiments may target other particular insect species or types, e.g. wasps or flies, or may target a set of different species or types.

In this particular embodiment, the UAV is an instance of a miniature quadrotor design, well known of those skilled in the art. The UAV comprises four electrical engines 10, four rotors 12 and a central unit 14. The central unit comprises a battery, four engine speed controllers and two processor boards.

The first processor board is an upper-level control board with an integrated GPU for advanced image processing. This first board is running PC software, including the OpenCV program library. It is connected through a serial link to a second processor board, the autopilot board. The autopilot board features a processor and inertial measurement unit (IMU).

Other embodiments may use different types of UAVs like ornithopter or plane, different types of rotorcrafts like hexa-copter or octocopter. Other embodiments may use distance and other sensors like for example ultrasonic distance sensors. In the illustrated embodiment the system includes two processors, one that mainly process images and performs upper-level control tasks and one that mainly achieve flight control tasks. However, in other embodiments, the system may feature a single processor. In other different embodiments the system may further include one or more additional processors.

In the illustrated embodiment, the imagers consist in a pair of infrared CMOS cameras 6 located on one side of the quadrotor as shown in FIG. 1. A variety of other imagers may also be appropriate. For example, CCD-based detectors may be used instead or in combination. Scanning devices may be used, or other types of detectors may be implemented in any number. While in this particular embodiment 3D images are produced and processed, in some other embodiments, a single imager delivering two-dimensional images may be sufficient. In some other embodiments, three-dimensional images may be delivered by only one imager, for example using the kinetic depth effect.

In the illustrated embodiment the imagers are attached to the UAV. In some other embodiments, a single or multiple imagers may be attached to a ground station. In another type of embodiment, one or more imagers may be physically independent from the UAV or ground station, to the extend that in some embodiments, the UAV may not include any imager at all.

This particular embodiment includes a set of infrared LEDs 16 attached to the UAV. The infrared LEDs are set to illuminate the field of view of the infrared CMOS camera, as shown in FIG. 1. In some embodiments different types of illumination sources may also be used, depending of imager type and sensibility. In some embodiments, the illumination source may not be embedded but located on the walls or ceiling if any, on the ground or they may be located anywhere else. In some other embodiments, an illumination source may not be required.

In the illustrated embodiment, the counteracting device consists of a voltage multiplier unit associated with an electrical grid 8 located on top of the quadrotor, as shown in FIG. 1. When in contact with two contiguous grid wires, a mosquito is electrocuted. In some other embodiments, other types of lethal or non lethal counteracting devices may be used. For example, the counteracting device may include a laser, may include an adhesive-coated grid or surface, may include an insecticide-coated grid or surface, may release an insecticide, may capture flying insects using a trap or cage. The counteracting device may kill the targeted insects, may repel them out of a zone or may impair one or more of their biological functions.

In some other embodiments, the system may use infrared distance sensors to detect obstacles in flight. Other embodiments may feature other distance sensors like ultrasonic or laser distance sensors. Other embodiments may prevent collisions in flight using images captured by the imagers.

Both processor boards used in this particular embodiment are readily available from specialized retailers. The electrified grid 8 and associated voltage multiplier unit is derived from an electric flyswatter of the usual type. Every other components of this embodiment can be readily purchased from retailers, or require only minor interventions to be adapted from ready-made components.

Operation

In this particular embodiment, the infrared LEDs emit infrared light in the field of view of the infrared CMOS cameras. The infrared CMOS cameras capture infrared images and send the images to the upper-level control board. Using OpenCV software routines, the upper-level board processor detects a mosquito, if present in the images. Using OpenCV routines, the upper-level board processor then tracks the mosquito position in three-dimensional coordinates. At this point, the upper-level board activates the autopilot board through the serial link, using Mavlink protocol. The upper-level control board processor sends instructions to the autopilot processor, in order to scramble the UAV, approach the mosquito, maneuver to touch and kill the insect.

Figure 2:
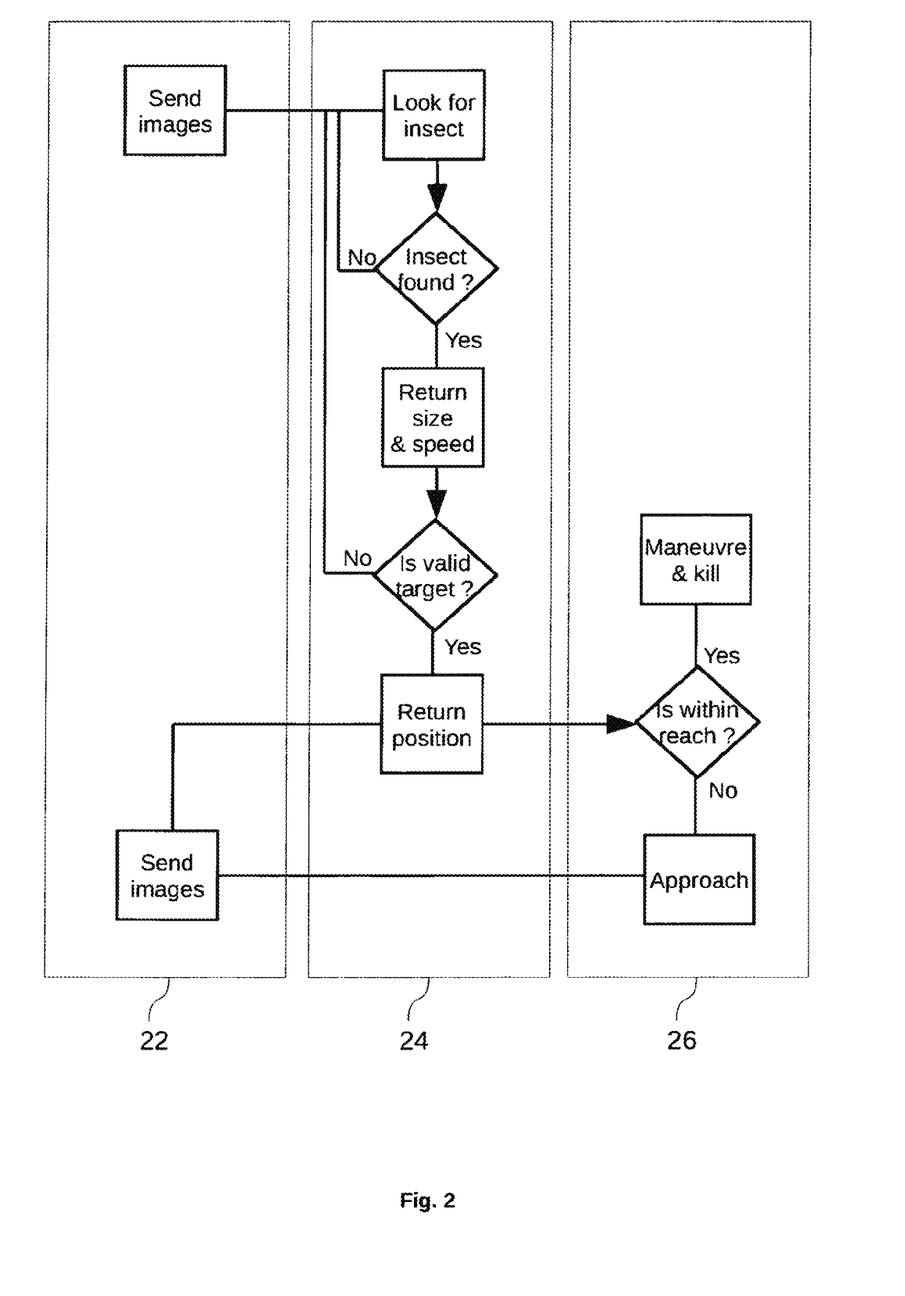
FIG. 2 is a control flow diagram for an implementation of a tracking and counteracting system.

FIG. 2 is a control flow diagram for an implementation of the system operation, illustrating cooperation of imager assembly 22, tracking assembly 24 and flight control assembly 26. In some other embodiments, the control flow diagram may be different.

In the illustrated embodiment, flight control data sent to the autopilot processor include yaw, roll and pitch angles as well as throttle. In some other embodiments higher levels of flight control data may be sent, like flight direction, waypoints or targeted coordinates. In some other embodiments lower levels of flight control data may be sent, like angular speed of individual engines and rotors. In some embodiments, a flight control protocol other than Mavlink may be used. In some other embodiments, like those using a single processor board, no flight control protocol may be required.

In the illustrated embodiment, the upper-level board processor running OpenCV software performs mosquito identification, using characteristic properties of insect size and airspeed. In some other embodiments, insect type may be detected more broadly e.g. all flying insects, or more specifically e.g. culcidae only. In some embodiments, characteristic properties used for identification may be different than insect size and airspeed and may include insect shape, trajectory, ground speed, location, characteristic frequency of wingbeat, harmonic amplitude of wingbeat. In some embodiments, insect identification may be performed using other computer vision software than OpenCV. In some embodiments, insect identification may be performed using other type of hardware, e.g. a photodiode capturing the insect wingbeat frequency. In some embodiments, no insect identification may be performed and the system may counteract any flying insect it detects. In some embodiments, insect localization or tracking may be two-dimensional only.

In the illustrated embodiment, flight methods include approaching the insect from beneath. This type of approach is preferred in order to minimize disturbances of mosquito flight caused by rotor wind. The flow of air passing through the electrified grid attracts any mosquito flying over the UAV at close range.

The flight control method used in the illustrated embodiment consists of three different behaviors or rules. The choice between each behavior depends upon relative positions of UAV and targeted mosquito. The first behavior applies when the UAV flies higher than the targeted mosquito. In this case, the UAV is guided following a vertical descending path and is flown to a lower altitude than the mosquito. The second behavior applies to flight control when the UAV flies at a lower altitude than the mosquito but is relatively far away. When in this position, the UAV is flown towards a point located under the mosquito, within short distance. The third behavior applies to flight control when the mosquito is within reach of the UAV, i.e. when the electrified grid is located under the mosquito, within short distance. When in such a position, the UAV is quickly maneuvered upwards, until it touches the mosquito with the electrified grid.

In other embodiments, flight methods may include different behaviors. Flight methods may for example include acrobatic maneuvers like loops, spins or rolls, may include descending approaches. In other embodiments, flight methods may not require approaching or touching the targeted insect and may include operating remote counteracting devices, e.g. lasers.

In this particular embodiment, the protected volume or zone is defined by the detection range of the system. In some embodiments, the detection range may be broadened. For example, in some embodiments the processor may be configured to apply methods of patrolling the surrounding environment.

In some embodiments, the scan for insects may be performed within a user-defined volume or zone. In some embodiments, a processor may be configured to map the flight environment.

Second Embodiment

Figure 3:
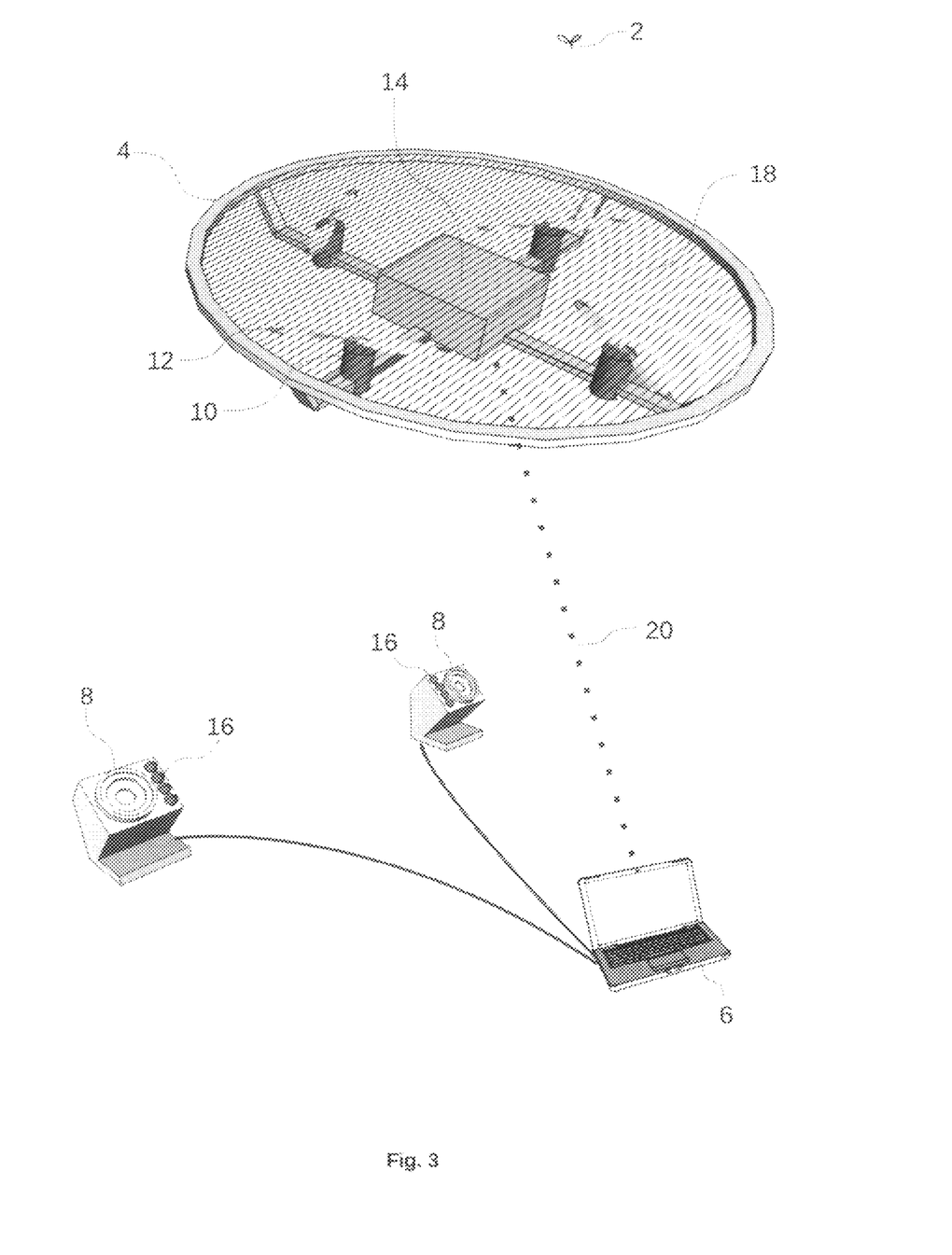
FIG. 3 illustrates a second embodiment of a tracking and counteracting system.

As shown in FIG. 3, a system for identifying, tracking and counteracting female mosquitoes 2 or other insects includes in this particular embodiment a UAV 4, a ground station 6 and two imagers 8.

In some other approaches, the number of UAVs, imagers and processors may be different. In this particular embodiment, the UAV and the ground station each include a processor, but in some other embodiments the number of processors may be different. The ground station featured in this particular embodiment is a common type of personal computer with sufficient processing power. In other embodiments the ground station may be a more specialized unit.

In this particular embodiment, the UAV is an instance of a miniature quadrotor design, well known of those skilled in the art. The UAV features a battery, four electrical engines 10, four rotors 12 and a flight control unit 14 comprising a processor and inertial measurement unit (IMU). Other embodiments may feature different types of UAVs like ornithopter or plane, different types of rotorcrafts like hexacopter or octocopter. They may feature different types of imagers and sensors like ultrasonic distance sensors.

In the illustrated embodiment, the imagers are a pair of infrared CMOS cameras 8 linked to the ground station as shown in FIG. 3. A variety of other imagers may also be appropriate. For example, CCD-based detectors, scanning systems, or other types of detectors may be implemented in any number.

This particular embodiment includes a set of infrared LEDs 16 placed on the side of the imagers to illuminate its field of view, as shown in FIG. 3. In some embodiments different types of illumination sources may also be used, depending of imager type and sensibility, and the illumination sources may be located in different places. In some other embodiments, an illumination source may not be required.

In the illustrated embodiment, the counteracting device consists of a voltage multiplier unit associated with an electrical grid 18 located on top of the quadrotor, as shown in FIG. 3. When in contact with two contiguous grid wires, an insect is electrocuted. In some other embodiments, different lethal or non lethal counteracting devices may be embedded. For example, the counteracting device may include a laser, may include an adhesive-coated grid or surface, may include an insecticide-coated grid or surface, may release an insecticide, may capture flying insects using a trap or cage, may kill the targeted insects, repel them out of a volume or zone or impair one or more of their biological functions.

Other embodiments may use infrared distance sensors to detect obstacles in flight, or may feature other distance sensors like ultrasonic or laser distance sensors or may use the images captured by the imagers to avoid collisions in flight.

In the illustrated embodiment, data transmission between UAV and ground station uses an IEEE 802.11 standard (Wi-Fi) connection 20. Data transmitted from the UAV to the ground station through Wi-Fi consist in telemetry data such as UAV attitude and acceleration. Data transmitted from the ground station to the UAV consist in flight control data. In the illustrated embodiment, flight control data sent to the UAV include yaw, roll and pitch angles as well as throttle. In some other embodiments higher levels of flight control data may be sent, like flight direction, waypoints or targeted coordinates. In some other embodiments lower levels of flight control data may be sent, like angular speed of individual engines and rotors.

Some other embodiments may feature other data transmission means, devices or protocols.

In the illustrated embodiment, the system is designed to specifically target female mosquitoes. In other embodiments, the system may be designed to counteract other types of flying insects, e.g. wasps or flies.

In the illustrated embodiment, the ground station processor running OpenCV software performs insect detection, three dimensional insect localization and insect tracking functions. Other embodiments may use other software. In some embodiments, insect detection, localization or tracking may be two dimensional only or may be performed with more than one processor.

In the illustrated embodiment, the ground station processor running OpenCV software performs an insect identification task that consists in detecting targeted insect type (here: female mosquito), using characteristic properties of size and airspeed. In some embodiments, insect type may be detected more broadly of more specifically by retaining other criteria like for example subfamily or age. In some embodiments, characteristic properties used for identification may be different than insect size and airspeed and may include insect shape, trajectory, ground speed, location, characteristic frequency of wingbeat, harmonic amplitude of wingbeat. In some embodiments, insect identification may be performed using other type of software or other type of hardware e.g. a photodiode capturing the insect wingbeat frequency. In some embodiments, no insect identification may be performed and the system may counteract any flying insect it detects.

In the illustrated embodiment, flight methods include approaching the insect from beneath. This type of approach is preferred in the illustrated embodiment in order to minimize disturbances of mosquito flight caused by rotor wind. This type of approach is also adopted in the illustrated embodiment because the flow of air passing through the electrified grid attracts any mosquito flying over the UAV at close range. More specifically, the flight control method used in the illustrated embodiment consists of three different behaviors or rules. The choice between each behavior depend upon relative positions of UAV and targeted mosquito. The first behavior applies when the UAV flies higher than the targeted mosquito. In this case, the UAV is guided following a vertical descending path and is flown to a lower altitude than the mosquito. The second behavior applies to flight control when the UAV flies at a lower altitude than the mosquito but is relatively far away. When in this position, the UAV is flown towards a point located under the mosquito. The third behavior applies to flight control when the mosquito is within reach of the UAV, i.e. when the electrified grid is located under the mosquito and the distance separating UAV and mosquito is short. When in such a position, the UAV is maneuvered directly and quickly towards the mosquito, in order to touch it with the electrified grid.

In other embodiments, flight methods may include very different behaviors. Flight methods may for example include aggressive or acrobatic UAV maneuvers, may include descending approaches, may include operating remote counteracting devices e.g. lasers.

In this particular embodiment, the protected volume or zone is defined by the detection range of the system and by surrounding obstacles. In some other embodiments, the scan for insects may be performed within a user-defined volume or zone. In some embodiments, the insect detection range may be enlarged by displacing the UAV. In some embodiments, the processor may be configured to apply methods of patrolling within the protected volume or zone. In some embodiments, a processor may be configured to localize and map the flight environment.

Third Embodiment

Figure 4:
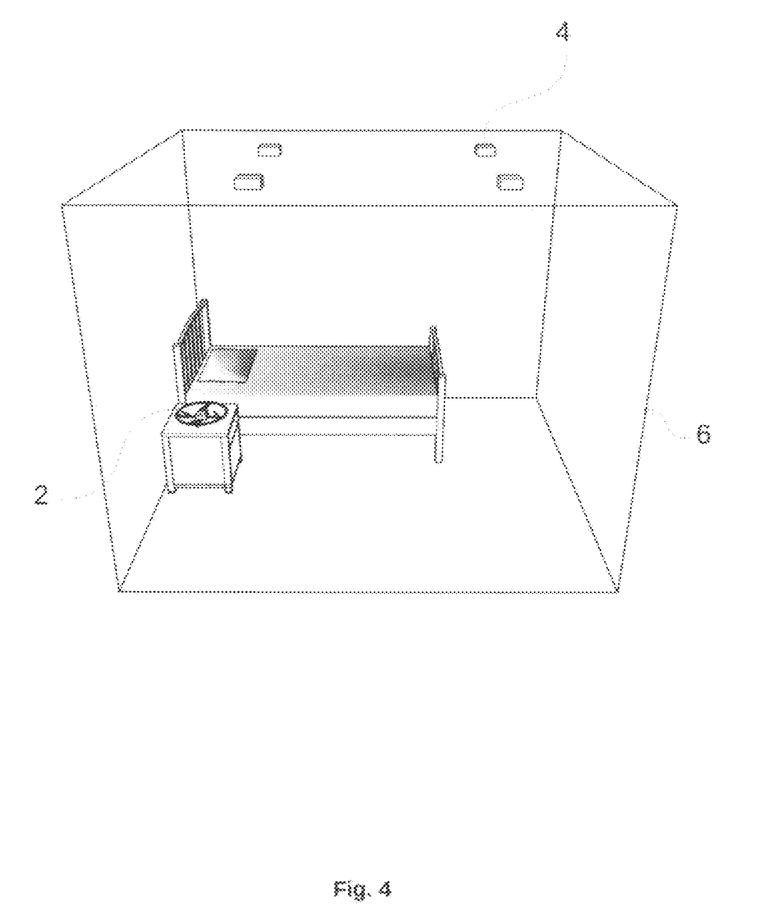
FIG. 4 illustrates a third embodiment of a tracking and counteracting system.

As shown in FIG. 4, a system for identifying, tracking and counteracting female mosquitoes or other insects includes in this particular embodiment a UAV 2 and an imagers set 4.

In this particular embodiment, the tracking and counteracting system protects a defined zone 6 against female mosquitoes.

The imagers set and the UAV each include a processor.

In some other approaches, the number of UAVs, imagers in the imagers set and processors may be different.

In this particular embodiment, the UAV is an instance of a miniature quadrotor design, well known of those skilled in the art. Other embodiments may feature different types of UAVs like ornithopter or plane, different types of rotorcrafts like hexacopter or octocopter. They may feature different types of imagers and sensors like ultrasonic distance sensors.

In the illustrated embodiment, the imagers in the imagers set each include an infrared CMOS cameras. A variety of other imagers may also be appropriate. For example, CCD-based detectors, scanning systems, or other types of detectors may be implemented in any number.

In this particular embodiment, there are four imagers included in the imagers set, while in other embodiments, there may be more than four imagers, or less than four.

In this particular embodiment, the imagers set is located on the ceiling of a room within a house or building. In other embodiments, it can be located on the wall or floor, on furniture, or on any object that could support it, indoors or outdoors.

The imagers in the imagers sets of this particular embodiment each include a number of infrared LEDs to illuminate its field of view. In some embodiments different types of illumination sources may also be used, depending of imager type and sensibility, and the illumination sources may be located in different places. In some other embodiments, an illumination source may not be required.

In the illustrated embodiment, the counteracting device consists of a voltage multiplier unit associated with an electrical grid located on top of the quadrotor, as shown in the first and second embodiments. In some other embodiments, different lethal or non lethal counteracting devices may be embedded. For example, the counteracting device may include a laser, may include an adhesive-coated grid or surface, may include an insecticide-coated grid or surface, may release an insecticide, may capture flying insects using a trap or cage, may kill the targeted insects, repel them out of a volume or zone or impair one or more of their biological functions.

Other embodiments may use infrared distance sensors to detect obstacles in flight, or may feature other distance sensors like ultrasonic or laser distance sensors or may use the images captured by the imagers to avoid collisions in flight.

In the illustrated embodiment, data transmission between UAV and imagers set uses an IEEE 802.11 standard (Wi-Fi) connection. Data transmitted from the UAV to the imagers set through Wi-Fi consist in telemetry data such as UAV attitude and acceleration. Data transmitted from imagers set to the UAV consist in flight control data. In the illustrated embodiment, flight control data sent to the UAV include yaw, roll and pitch angles as well as throttle. In some other embodiments higher levels of flight control data may be sent, like flight direction, waypoints or targeted coordinates. In some other embodiments lower levels of flight control data may be sent, like angular speed of individual engines and rotors. Some embodiments may feature other data transmission means, devices or protocols.

In the illustrated embodiment, the system is designed to specifically target female mosquitoes. In other embodiments, the system may be designed against other types of flying insects, e.g. wasps or flies.

In the illustrated embodiment, the imagers set processor running OpenCV software performs insect detection, three dimensional insect localization and insect tracking functions. Other embodiments may use other software. In some embodiments, insect detection, localization or tracking may be two dimensional only or may be performed with more than one processor.

In the illustrated embodiment, the imagers set processor running OpenCV software performs an insect identification task that consists in detecting targeted insect type (here: female culcidae), using characteristic properties of size and airspeed. In some embodiments, insect type may be detected more broadly of more specifically by retaining other criteria like for example subfamily or age. In some embodiments, characteristic properties used for identification may be different than insect size and airspeed and may include insect shape, trajectory, ground speed, location, characteristic frequency of wingbeat, harmonic amplitude of wingbeat. In some embodiments, insect identification may be performed using other type of software or other type of hardware e.g. a photodiode capturing the insect wingbeat frequency. In some embodiments, no insect identification may be performed and the system may counteract any flying insect it detects.

In the illustrated embodiment, flight methods include approaching the insect from beneath. This type of approach is preferred in the illustrated embodiment in order to minimize disturbances of mosquito flight caused by rotor wind. This type of approach is also adopted in the illustrated embodiment because the flow of air passing through the electrified grid attracts any mosquito flying over the UAV at close range. More specifically, the flight control method used in the illustrated embodiment consists of three different behaviors or rules. The choice between each behavior depend upon relative positions of UAV and targeted mosquito. The first behavior applies when the UAV flies higher than the targeted mosquito. In this case, the UAV is guided following a vertical descending path and is flown to a lower altitude than the mosquito. The second behavior applies to flight control when the UAV flies at a lower altitude than the mosquito but is relatively far away. When in this position, the UAV is flown towards a point located under the mosquito. The third behavior applies to flight control when the mosquito is within reach of the UAV, i.e. when the electrified grid is located under the mosquito and the distance separating UAV and mosquito is short. When in such a position, the UAV is maneuvered directly and quickly towards the mosquito, in order to touch it with the electrified grid.

In other embodiments, flight methods may include very different behaviors. Flight methods may for example include aggressive or acrobatic UAV maneuvers, may include descending approaches, may include operating remote counteracting devices e.g. lasers.

In this particular embodiment, the protected volume or zone is a room within a house or building. In some other embodiments, the scan for insects may be performed within a user-defined volume or zone. The protected volume or zone may be located indoors or outdoors.

In some embodiments, the insect detection range may be enlarged by displacing the UAV. In some embodiments, the processor may be configured to apply methods of patrolling within the protected volume or zone. In some embodiments, a processor may be configured to localize and map the flight environment.

CONCLUSION, RAMIFICATION, SCOPE

The UAV-enforced no-fly zone in its different embodiments provides a system to counteract mosquitoes or other flying insects in a clean and effective way, presenting no danger for human beings and other animals as well as for the environment, and ensuring that each and every harmful insect within an area is individually killed, disabled or respelled.

While the above descriptions of embodiments contain many specificities, these should not be construed as limitations on the scope, but rather as examples. Many other variations are possible. For example many other types of UAVs can be used, other than the quadrotors shown in the figures, or many other types of flight control methods and insect approach methods can be used, other than the ones described above.

Accordingly, the scope should be determined not by the embodiments illustrated, but by the appended claims and their legal equivalents.

What is claimed is:

1. A system for counteracting flying insects, comprising:
an unmanned aerial vehicle of the rotorcraft type, having a body connected to a number of spinning rotors, said spinning rotors generating an airflow enabling insects flying over said spinning rotors to be drawn towards said unmanned aerial vehicle,
one or more grids attached to said body in a manner that said airflow passes though said grid, so that said drawn insects are collected on said grids or touch said grids,
an imager having a field of view,
one or more processors configured to track an insect in the field of view of the said imager and to control the flight of said unmanned aerial vehicle.

2. The system in claim 1 wherein the unmanned aerial vehicle is a quadrotor.

3. The system in claim 1 wherein the unmanned aerial vehicle is a hexacopter or octocopter.

4. The system in claim 1 further comprising an illumination light source arranged to illuminate the field of view of the imager.

5. The system in claim 1 wherein the imager operates in the infrared spectrum.

6. The system in claim 1 wherein one or more processors are configured to identify a biological property of an insect in the field of view of the imager, using at least one datum selected from the group consisting of shape, size, airspeed, ground speed, trajectory, location, frequency of wingbeat, harmonic amplitude of wingbeat.

7. The system in claim 6 wherein the biological property is selected from the group consisting of insect order, suborder, infraorder, superfamily, family, subfamily, genus, subgenus, age and sex.

8. The system in claim 1 wherein the grid is an electrified grid.

9. The system in claim 1 wherein the grid is an adhesive-coated grid or an insecticide-coated grid.

10. A method of counteracting flying insects, comprising:
acquiring images from an imager,
determining that an image includes an insect at a location,
approaching the insect with one or more unmanned aerial vehicles,
drawing the insect with an airflow towards said unmanned aerial vehicle,
touching the insect or collecting the insect with a grid embedded in said unmanned aerial vehicle.

11. The method in claim 10 further comprising determining a biological property of the insect, using at least one datum selected from the group consisting of shape, size, airspeed, ground speed, trajectory, location, characteristic frequency of wingbeat, harmonic amplitude of wingbeat.

12. The method in claim 10 further comprising avoiding obstacles in flight.

13. The method in claim 10 further comprising patrolling in search for insects.

* * * * *